(12) United States Patent
Boggy

(10) Patent No.: US 8,942,266 B2
(45) Date of Patent: Jan. 27, 2015

(54) ANGULAR BEAM ADJUSTMENT SYSTEMS AND METHODS FOR LASER SYSTEMS

(75) Inventor: Richard Boggy, Sunnyvale, CA (US)

(73) Assignee: Newport Corporation, Irvine, CA (US)

( * ) Notice: Subject to any disclaimer, the term of this patent is extended or adjusted under 35 U.S.C. 154(b) by 499 days.

(21) Appl. No.: 13/390,503

(22) PCT Filed: Aug. 19, 2010

(86) PCT No.: PCT/US2010/046019
§ 371 (c)(1),
(2), (4) Date: Jul. 30, 2012

(87) PCT Pub. No.: WO2011/022547
PCT Pub. Date: Feb. 24, 2011

(65) Prior Publication Data
US 2012/0281722 A1 Nov. 8, 2012

Related U.S. Application Data

(60) Provisional application No. 61/235,671, filed on Aug. 20, 2009.

(51) Int. Cl.
*H01S 3/10* (2006.01)
*H01S 3/091* (2006.01)
*H01S 3/106* (2006.01)
*H01S 3/08* (2006.01)
*H01S 3/081* (2006.01)
*H01S 3/11* (2006.01)

(52) U.S. Cl.
CPC ............. *H01S 3/106* (2013.01); *H01S 3/08027* (2013.01); *H01S 3/08059* (2013.01); *H01S 3/0811* (2013.01); *H01S 3/0816* (2013.01); *H01S 3/11* (2013.01); *H01S 3/1109* (2013.01)
USPC .................. 372/20; 372/93; 372/100; 372/71

(58) Field of Classification Search
USPC ........................................ 372/20, 71, 93, 100
See application file for complete search history.

(56) References Cited

U.S. PATENT DOCUMENTS

| 3,594,663 A | 7/1971 | Allen |
| 4,462,103 A | 7/1984 | Salour et al. |
| 5,079,772 A | 1/1992 | Negus et al. |

(Continued)

FOREIGN PATENT DOCUMENTS

| JP | 09-298331 | 11/1997 |
| JP | 10-148571 | 1/1998 |

(Continued)

OTHER PUBLICATIONS

Asaki et al., "Generation of 11-fs pulses from a self-mode-locked Ti:sapphire laser," Opt. Letters, vol. 18 (1993) pp. 977-979.

(Continued)

*Primary Examiner* — Colleen A Matthews
*Assistant Examiner* — Marcia Golub-Miller
(74) *Attorney, Agent, or Firm* — Anderson IP, Inc.

(57) ABSTRACT

Embodiments are directed to systems and methods for correcting lateral and angular displacement of laser beams within a laser cavity. For some embodiments, such systems and methods are used to correct angular displacement of laser beams within a laser cavity that result from varying the lasing wavelength in a tunable laser system.

39 Claims, 4 Drawing Sheets

(56) References Cited

U.S. PATENT DOCUMENTS

| | | | |
|---|---|---|---|
| 5,097,471 | A | 3/1992 | Negus et al. |
| 5,185,750 | A | 2/1993 | Kafka et al. |
| 5,212,698 | A | 5/1993 | Kafka et al. |
| 5,235,605 | A | 8/1993 | Rines et al. |
| 5,276,695 | A | 1/1994 | Scheps |
| 5,553,093 | A | 9/1996 | Ramaswarny et al. |
| 5,633,883 | A * | 5/1997 | Shi et al. ............... 372/20 |
| 5,815,519 | A | 9/1998 | Aoshima et al. |
| 6,055,261 | A | 4/2000 | Reed et al. |
| 6,317,449 | B1 | 11/2001 | Zanger et al. |
| 6,594,301 | B2 | 7/2003 | Pang |
| 6,853,655 | B2 | 2/2005 | Holsinger |
| 6,930,822 | B2 | 8/2005 | Boggy et al. |
| 7,555,023 | B2 | 6/2009 | Ell et al. |
| 8,218,587 | B2 | 7/2012 | Stoev et al. |
| 2002/0136245 | A1 | 9/2002 | Pang |
| 2009/0034077 | A1 | 2/2009 | Kane |
| 2011/0292954 | A1 | 12/2011 | Stoev et al. |

FOREIGN PATENT DOCUMENTS

| | | |
|---|---|---|
| JP | 2001-244530 | 7/2001 |
| JP | 2004-004112 | 8/2004 |
| JP | 2006-049839 | 2/2006 |
| WO | WO 93/22810 | 11/1993 |
| WO | WO 2006/133387 | 12/2006 |
| WO | WO 2011/022547 | 2/2011 |

OTHER PUBLICATIONS

Christov et al., "Fourth-order dispersion-limited solitary pulses," Opt. Letters, vol. 19 (1994) pp. 1465-1467.

Christov et al., "Sub-10-fs operation of Kerr-lens mode-locked lasers," Opt. Letters, vol. 21 (1996) pp. 1493-1495.

Ell et al., "Generation of 5-fs pulses and octave-spanning spectra directly from a Ti:sapphire laser," Opt. Letters, vol. 26, (2001) pp. 373-375.

Golubovic et al., "Double Gires-Tournois interferometer negative-dispersion mirrors for use in tunable mode-locked lasers," Opt. Letters, vol. 25, (2000) pp. 275-277.

Hermann et al., "Ionization studies in laser-excited alkaline-earth vapors," Opt. Letters, vol. 22 (1997) pp. 236-238.

International Preliminary Report on Patentability dated: Mar. 1, 2012 in International Application No. PCT/US2010/046019 filed on Aug. 19, 2010 and published as: WO 2011/022547 on Feb. 24, 2011.

International Search report and Written Opinion mailed on: Apr. 29, 2011 in International Application No. PCT/US2010/046019 filed on Aug. 19, 2010 and published as: WO 2011/022547 on Feb. 24, 2011.

Lai et al., "Construction of a Wavelength-Tunable Self-Starting Kerr Lens Mode-Locked Ti: Sapphire Laser System," Chinese Journal of Physics, vol. 34 (1996) pp. 111-121.

Lemoff and Barty, "Cubic-phase-free dispersion compensation in solid-state ultrashortpulse lasers," Opt. Letters, vol. 18 (1993) pp. 57-59.

Mayer et al., "Ultrabroadband chirped mirrors for femtosecond lasers," Opt. Letters, vol. 22 (1997) pp. 528-530.

Zhu et al., "Study of dispersion compensation in femtosecond lasers," J. of Modern Optics, vol. 43 (1996) pp. 1701-1721.

Office Action dated: Mar. 7, 2012 in U.S. Appl. No. 12/790,653, filed May 28, 2012 and Issued as: 8,218,587 on Jul. 10, 2012.

Aoshima et al., "Compact Diode-Pumped $Cr^{3+}$:$LiSrAlF_6$ Femtosecond Laser," Jpm. J. Appl Phys, vol. 36(1997) pp. L114-L116.

Paschotia et al., "Passive mode locking of thin-disk laser: effects of spatial hold burning," Appl. Phys. B 72, 267-278 (2001).

Schibli et al., "Toward Single-Cycle Laser Systems," IEE Journal of Selected Topics in Quantum Electronics, vol. 9. No. 4, pp. 990-1001, Jul./Aug. 2003.

European Search Report dated May 14, 2014 in European Application No. EP10810596.

Qing et al., "Generation of sub-10 fs Laser Pulse by a Ring Oscillator with a High Repetition Rate," Chinese Physics Letters, Institute of Physics Publishing, Bristol, GB, vol. 26, No. 4 Apr. 1, 2009.

* cited by examiner

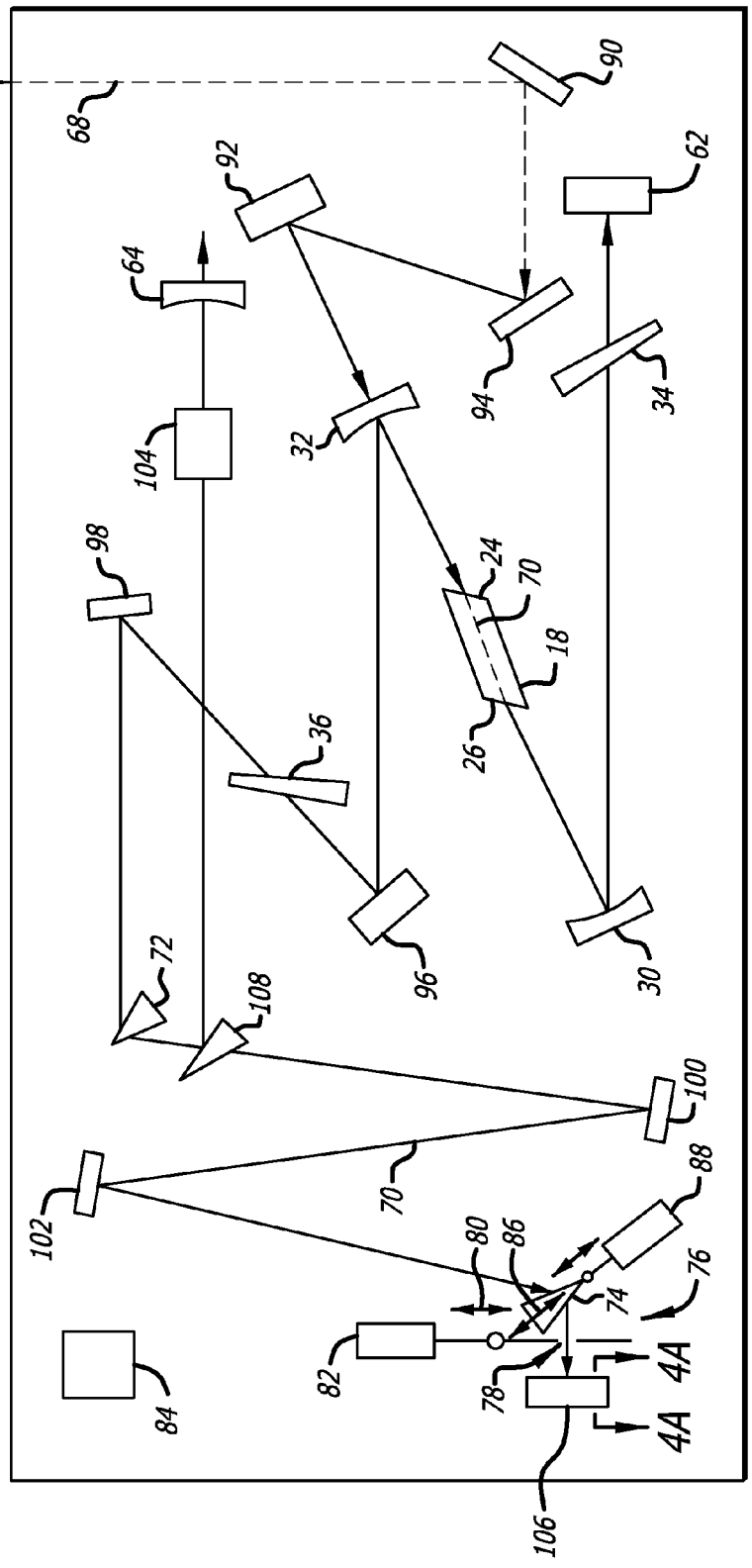

US 8,942,266 B2

ANGULAR BEAM ADJUSTMENT SYSTEMS AND METHODS FOR LASER SYSTEMS

RELATED APPLICATIONS

This application is a national stage application under 35 U.S.C. section 371 of international patent application no. PCT/US2010/046019, filed Aug. 19, 2010, entitled ANGULAR BEAM ADJUSTMENT SYSTEMS AND METHODS FOR LASER SYSTEMS, naming Richard Boggy as inventor, which claims priority from U.S. Provisional Patent Application No. 61/235,671, titled ANGULAR BEAM ADJUSTMENT SYSTEMS AND METHODS FOR LASER SYSTEMS, filed Aug. 20, 2009, naming Richard Boggy as inventor, both of which are incorporated by reference herein in their entirety.

FIELD OF THE INVENTION

Some embodiments relate in part to optical systems and methods for generating laser output beams. Some embodiments are directed more specifically to optical systems and methods for generating stable ultrashort pulse laser output with a tunable wavelength.

BACKGROUND

Laser systems may be useful for many different applications. More particularly, tunable laser systems capable of emitting one or more optical beams over a range of wavelengths are presently used in applications including, without limitation, multiphoton microscopy, optical coherence tomography, and harmonic generation. For some such applications, lasers having ultrashort pulse widths which are tunable over a range of lasing wavelengths may be desirable. While such attributes may be desirable, the modalities utilized within the laser system to generate these features may create practical difficulties. For example, a tunable laser that is configured to operate over a range of lasing wavelengths may be difficult to stabilize over the full tuning range because the interaction of the laser light with the optics of the system is wavelength dependent. This phenomenon may be exacerbated in a laser system that produces ultrashort pulses that are sensitive to the dispersive properties of the optical system.

Wavelength tunable laser systems having ultrashort pulse widths have been in use and are generally known. However, what has been needed are stable and reliable tunable laser systems that operate with an ultrashort pulse width and which are tunable over a broad range of operating wavelengths. What has also been needed are such tunable laser systems with output beams which are stable over the entire operating range of wavelengths without the need for external adjustment and which are capable of maintaining stable pulses over the entire tunable range.

SUMMARY

Some embodiments are directed to a wavelength tunable laser system, including a laser cavity defined by an end mirror disposed at a first end of the laser cavity and an output coupler disposed at a second end of the laser cavity. A gain medium may be disposed within the laser cavity and includes an opposed pair of beam input surfaces with at least one of the beam input surfaces comprising an angled beam input surface which is formed at an angle which is non-perpendicular to a laser beam path within the gain medium. A pump source is configured to generate a pump beam that passes through the gain medium along the laser beam path within the gain medium. A wavelength tuning device is configured to tune the laser system to lase at a band centered at a predetermined wavelength that can be controllably varied over a predetermined range of wavelengths. At least one beam angle correction device is coupled to the laser cavity and configured to passively correct angular laser beam deviation due to variation of the predetermined wavelength of the wavelength tuning element.

Some embodiments are directed to a wavelength tunable laser system, including a laser cavity defined by an end mirror disposed at a first end of the laser cavity and an output coupler disposed at a second end of the laser cavity. A gain medium may be disposed within the laser cavity and includes an opposed pair of beam input surfaces comprising angled surfaces at Brewster's angle relative to a laser beam path within the gain medium for a laser beam tuned to a band centered at a wavelength within a predetermined range of wavelengths. A pump source may be configured to generate a pump beam that passes through the gain medium along the laser beam path within the gain medium. A wavelength tuning element is configured to tune the laser system to lase at a band centered at a predetermined wavelength that can be controllably varied over said predetermined range of wavelengths. A first beam angle correction element is disposed in the laser cavity between the gain medium and the end mirror and is configured to passively correct angular laser beam deviation due to variation of the predetermined wavelength of the wavelength tuning element. A second beam angle correction element is disposed in the laser cavity between the gain medium and the output coupler and is configured to passively correct angular laser beam deviation due to variation of the predetermined wavelength of the wavelength tuning element.

Some embodiments are directed to a method of angular stabilization of a beam path of a tunable laser, including pumping a gain medium disposed within a laser cavity of a tunable laser system to generate a laser beam within the laser cavity having a first wavelength with a first beam path. The laser system is then tuned to a second wavelength which is different from the first wavelength and which exits the gain medium on a second beam path different from the first beam path. The laser beam of the second wavelength is then passed through at least one angular beam position correction element that refracts said laser beam to an optical path that is substantially parallel to first beam path.

Certain embodiments are described further in the following description, examples, claims and drawings.

BRIEF DESCRIPTION OF THE DRAWINGS

FIG. 2A is a transverse cross section view of the gain medium of FIG. 1 taken along lines 2A-2A of FIG. 1.

FIG. 4 is a schematic view of a laser system embodiment.

FIG. 4A is an elevation view of a retrograde optic of FIG. 4 taken along lines 4A-4A in FIG. 4.

The drawings illustrate embodiments of the invention and are not limiting. For clarity and ease of illustration, the drawings are not made to scale and, in some instances, various aspects may be shown exaggerated or enlarged to facilitate an understanding of particular embodiments.

DETAILED DESCRIPTION

Figure 1:
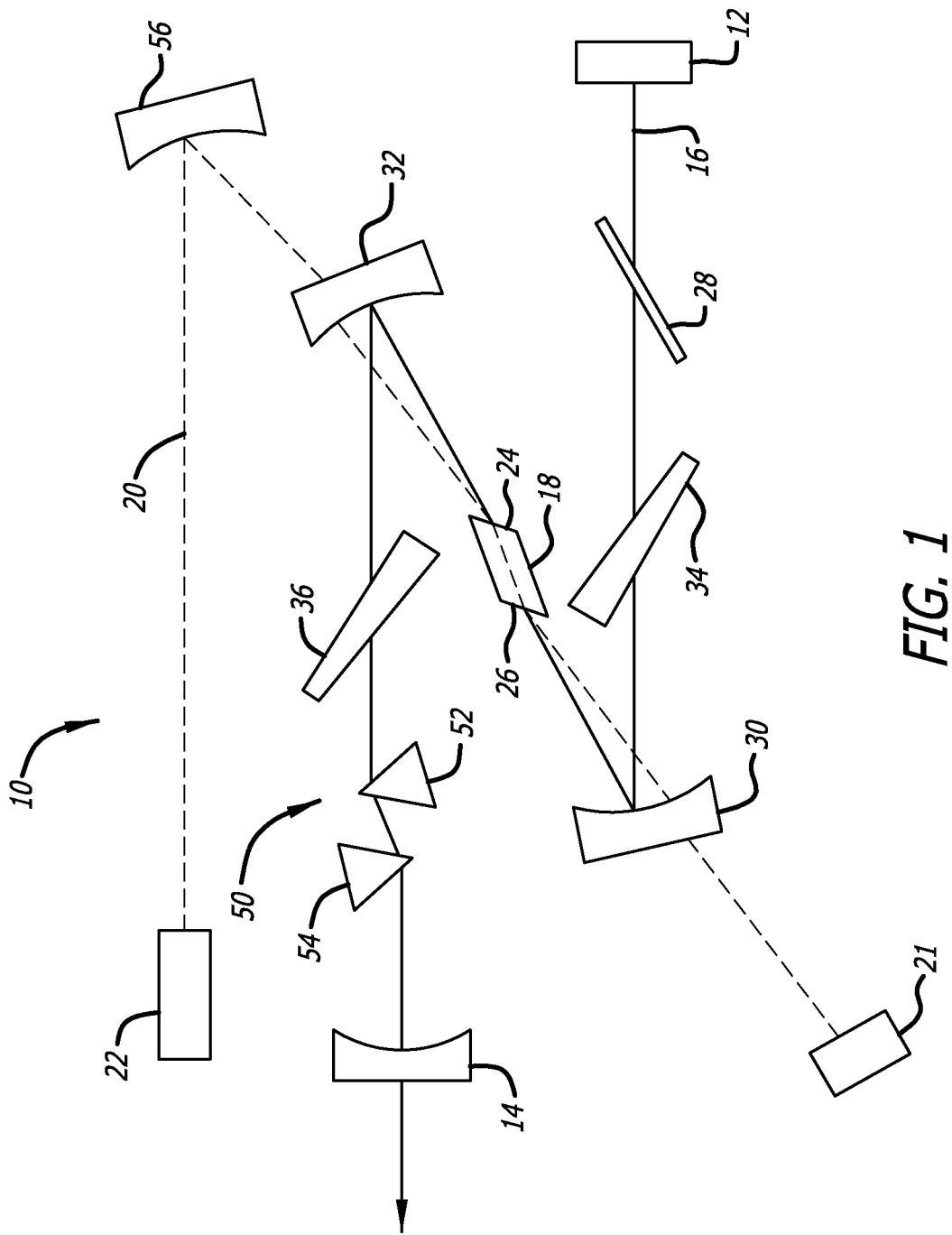
FIG. 1 illustrates a schematic representation of an embodiment of a laser system including a beam angle correction device.

FIG. 1 shows an embodiment of a tunable laser system 10. The laser system 10 includes a first reflector 12 and at least a second reflector 14, which may be in the form of an output coupler, which are aligned to create a laser cavity. In the illustrated embodiment, the first reflector 12 or end mirror includes a highly reflective optical element configured to reflect substantially all incident optical beams within a range of wavelengths while the second reflector or output coupler 14 may be configured to transmit at least a portion of an incident optical beam. The laser beam 16 may be incident upon a second dichroic mirror located within the laser cavity, which directs the second optical beam to the first reflector. The first reflector 12 reflects the laser beam 16 back through the laser cavity and gain medium 18 to the output coupler 14. FIG. 1 shows the residual unabsorbed pump beam 20 passing through the second dichroic mirror to a beam dump 21. For some embodiments, the positions of the first reflector 12 and the second reflector or output coupler 14 may be switched. The first and second reflectors 12 and 14 are aligned along with other intracavity optical elements to define a laser cavity.

At least one gain medium 18 may be positioned between the first and second reflectors 12 and 14. A pump beam source 22 emits the pump beam 20 at a pump wavelength into the laser cavity and into the gain medium 18 along a laser beam path 16 within the gain medium 18. The gain medium 18 may be constructed from a material configured to provide gain for an optical beam at a wavelength different from that of the pump beam 20 when excited by absorption of the pump beam 20 at the pump wavelength. As illustrated, the gain medium 18 may include one or more beam input surfaces 24 and 26 formed at a non-perpendicular angle, such as a Brewster angle, relative to an incident laser beam path 16 in order to minimize optical loss through reflection over a broad range of wavelengths. This range of wavelengths may be broad when compared to the range of wavelengths over which many available anti-reflective coatings are efficient.

The laser system 10 shown includes a wavelength tuning device 28 configured to tune the laser system 10 to lase at a band centered at a predetermined wavelength that can be controllably varied over a predetermined range of wavelengths. Such a configuration may be useful for producing ultrashort pulsewidth mode-locked laser output in the infrared spectrum, in some cases. For some embodiments, the laser system 10 may produce pulse widths of about 50 femtoseconds to about 150 femtoseconds, which may be useful for a variety of applications, including multiphoton microscopy. However, such a configuration may cause instability with respect to laser beam position as the laser system 10 is tuned over different wavelengths. In particular, the angled surfaces 24 and 26 of the gain medium 18 will cause beam deviation as the laser system 10 is tuned through different wavelengths.

The laser system 10 shown in FIG. 1 also includes a first collimating optic 30 disposed between the gain medium 18 and the end mirror 12 and a second collimating optic 32 disposed between the gain medium 18 and the output coupler 14. The collimating optics 30 and 32 are configured to increase collimation of the laser beam 16 emitted from the gain medium 18 into the respective collimating optic. For some embodiments, the first and second collimating optics 30 and 32 may include concave reflective optics having a focal length. For such embodiments, it may be desirable for each collimating optic 30 and 32 to be disposed a distance from the gain medium 18 which is approximately the same as the focal length of the respective collimating optic. Although the collimating optics 30 and 32 are configured to improve collimation of the laser beams 16 emitted from the gain medium 18, the collimating optics 30 and 32 do not completely collimate the laser beams 16 and the laser beams 16 may still need additional angular correction. Angular deviation of up to about 600 microradians or more, more specifically, up to about 400 microradians, may be present in such laser systems 10 without additional correction.

Figure 3:
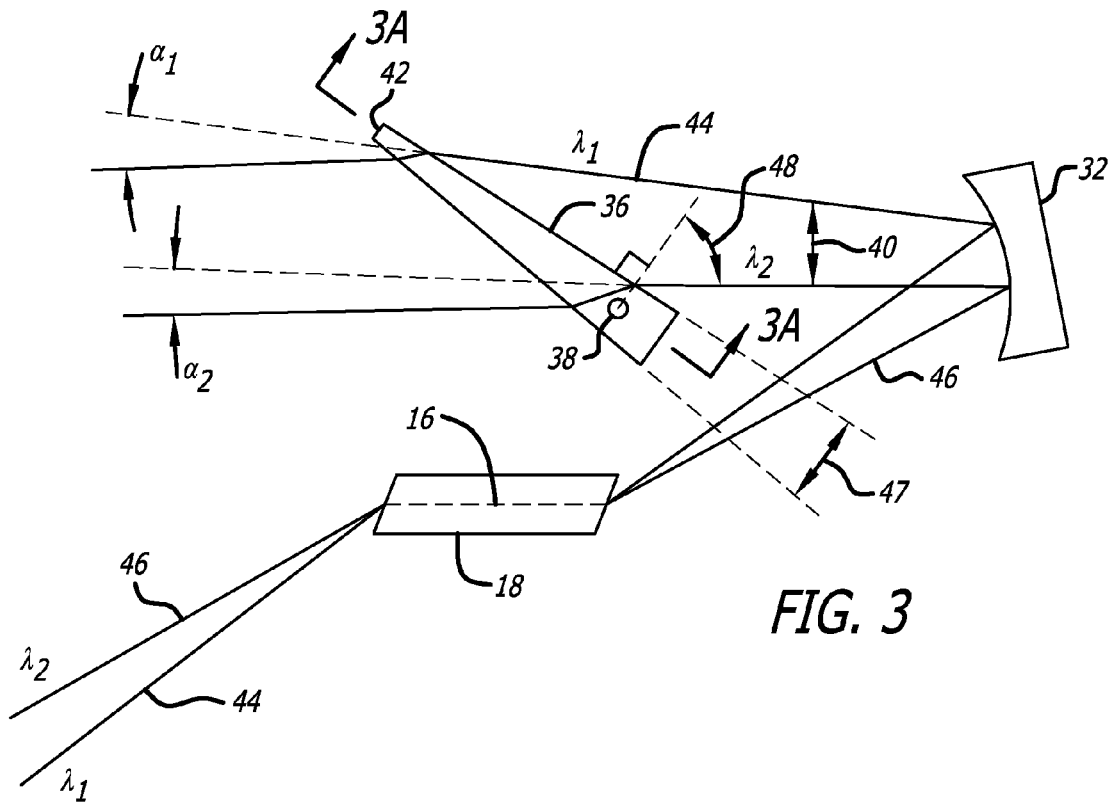
FIG. 3 illustrates the interaction of two laser beams with the gain medium, a collimating reflective optic and a beam angle correction element.
Figure 3A:
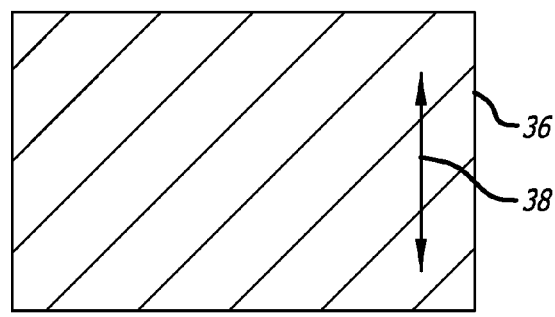
FIG. 3A is a transverse cross section view of the wedge optic of FIG. 3 taken along lines 3A-3A of FIG. 3.

As such, the laser system 10 also includes at least one beam angle correction device configured to passively correct angular laser beam deviation due to variation of the predetermined wavelength of the wavelength tuning device 28. For the embodiment shown, the beam angle correction device includes a first beam angle correction element 34 including a refractive wedge optic which is disposed in the laser beam path 16 and a second beam angle correction element 36 including a wedge optic also disposed in the laser beam path 16. The first beam angle correction element 34 is disposed in the laser cavity between the gain medium 18 and the end mirror 12 and the second beam angle correction element 36 is disposed in the laser cavity between the gain medium 18 and the output coupler 14. The wedge optics 34 and 36 are positioned with a tilt on a single axis of the wedge optics with respect to the beam path 16. The single axis tilt is configured such that a constant thickness axis of the refractive wedge optic is oriented substantially orthogonal to a direction of angular deviation of the laser beam 16. The constant thickness axis is defined as a line extending across the wedge optic at points of constant thickness. An example of a constant thickness axis is shown in FIG. 3 and as arrow 38 in FIG. 3A. The direction of angular deviation of the laser beam 16 is determined by angular deviation as a function of wavelength variation as shown by arrow 40 in FIG. 3. The wedge optics 34 and 36 may also be oriented or positioned such that a shorter wavelength of a first and second wavelength that is emitted from the gain medium 18 passes through a thinner end 42 of the refractive wedge optic 36 than a longer wavelength of the first and second wavelengths.

Figure 2:
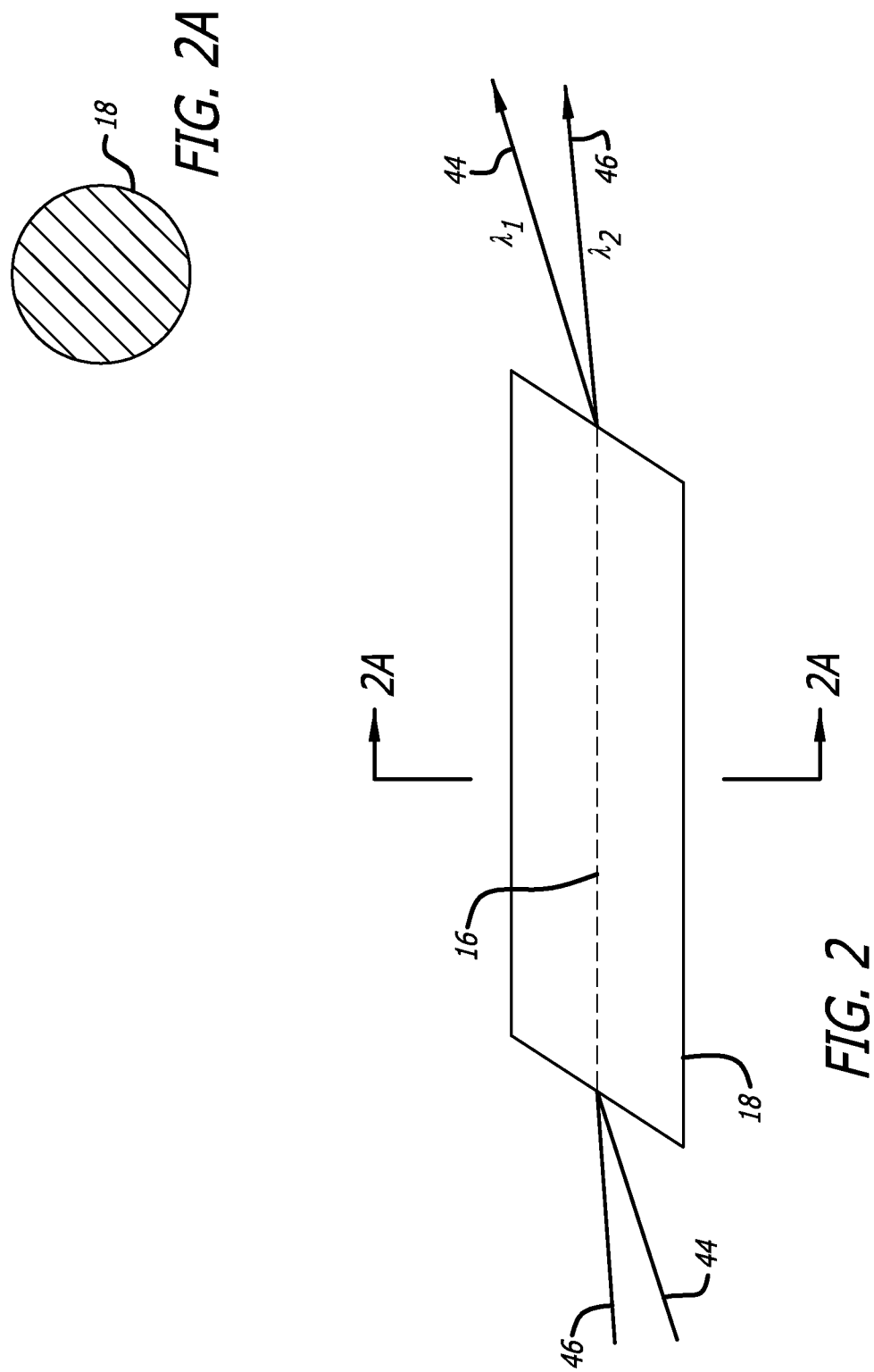
FIG. 2 shows an enlarged view of the gain medium of FIG. 1 with a ray trace of two different wavelengths being emitted from the gain medium.

FIG. 2 illustrates an enlarged view of an embodiment of the gain medium 18 showing a first laser beam 44 having first wavelength λ1 being emitted from the gain medium 18. A second laser beam 46 having a second wavelength λ2 is also shown being emitted from the gain medium 18. For the example shown, λ1 has a wavelength which is less than the wavelength of λ2. The difference between the two laser beam wavelengths may be achieved by tuning of the laser system 10 with the tuning device 28. As the pump beam 20 propagates through the gain medium 18 it is substantially absorbed by the gain medium 18. The laser beam 16 generated by the pump beam 20 substantially overlaps the line formed by the pump beam 20 regardless of the laser beam wavelength, thus the laser beam path 16 within the gain medium 18 is the same for all wavelengths. However, as the laser beam 16 exits the gain medium 18, it is refracted by the angled surface 24 or 26 of the gain medium 18. As can be seen from FIG. 2 in an exaggerated fashion, the shorter wavelength λ1 is refracted to a greater degree than wavelength λ2 due to the increased effective refractive index of the gain medium 18 at the shorter wavelength and a common beam path 16 within the gain medium 18 of all wavelengths. FIG. 3 illustrates the manner in which an embodiment of an angular beam correction element in the form of the wedge optic 36 corrects for the angular variation due to variation in lasing wavelength as the laser system 10 is tuned to varying desired wavelengths over a predetermined range of operating wavelengths.

As shown, the laser beam 44 having shorter wavelength $\lambda 1$ is emitted from the gain medium 18, reflects from the concave reflective optic 32 and is then incident on the wedge optic 36 at a thinner end 42 of the wedge optic 36. Laser beam $\lambda 1$ is then refracted through the wedge optic 36 and emitted therefrom to form an angle $\alpha 1$ with respect to the incident beam 44. The laser beam 46 having the wavelength $\lambda 2$, which is longer than $\lambda 1$, is refracted by the wedge element 36 and emitted therefrom to form an angle $\alpha 2$ with respect to the incident beam 46. As illustrated, $\lambda 1$ is refracted to a greater degree than $\lambda 2$ by the wedge optic 36 due to the higher effective index of refraction of the wedge element material at the shorter wavelength. As a result, $\alpha 1$ is greater than $\alpha 2$ and the wedge optic serves to converge the two laser beams 44 and 46 in an angular direction such that the two beams are substantially parallel to each other. The material and angle of the wedge element 36 may be chosen to achieve the desired effect of achieving substantially parallel laser beams over an operable range of wavelengths of the tunable system 10.

For some embodiments, the refractive wedge optics 34 and 36 may include an inclusive wedge angle 47 of about 1 degree to about 2 degrees, more specifically, about 1.4 degrees to about 1.6 degrees. For some embodiments, the refractive wedge optics 34 and 36 may be made from materials including fused silica, glass, quartz, or any other suitable refractive optical material useful over the predetermined range of wavelengths of operation of the laser system. The refractive wedge optics 34 and 36 may also be tilted relative to a laser beam axis 16 such that a surface normal of the refractive wedge optic facing the optical gain medium 18 forms an angle substantially equal to Brewster's angle with respect to the laser beam axis. Such a tilt angle 48 is illustrated in FIG. 3. Such embodiments of beam angle correction devices may be useful for wavelengths up to about 1.3 microns.

Although the above methods and devices address angular beam correction, it may also be desirable to correct transverse displacement deviation of the laser beam due to wavelength variation. As such, at least one transverse displacement correction device 50, an example of which is shown in FIG. 1, may be positioned within the laser cavity and configured to passively correct for the transverse spatial displacement of the laser beam 16 due to a change in the wavelength of the laser beam as the laser system is tuned with the tuner 28. If used in conjunction with one or more beam angle correction devices as discussed above, the laser system 10 may be configured to passively adjust a transverse position of the laser beam 16 such that laser beams of all wavelengths within the predetermined range have substantially the same laser beam path 16. In the illustrated embodiment, the transverse displacement correction device 50 includes a first correction element 52 in the form of a prism and at least a second correction element 54 also in the form of a prism. The prism pair of the transverse displacement correction device 50 may be configured to selectively refract laser beams 16 of different wavelengths due to tuning of the laser system 10 such that the laser beams 16 are transversely displaced an amount that corresponds to their position within the laser cavity.

In some embodiments, the first and second correction elements 52 and 54 are spaced apart by a predetermined distance which can be used to adjust the amount of transverse correction for a given prism pair or the like. The angular correction function of one or more of the beam angle correction device elements 52 and 54 may also be incorporated into one or more of the elements of the transverse displacement correction device. For example, one of the wedge elements 34 and 36 of the beam angle correction device shown in FIG. 1 may be replaced by varying the wedge angle of one or both of the prisms of the transverse displacement correction device 50. For some embodiments, the first and second correction elements 52 and 54 are spaced apart by about 0.25 inches to about 12 inches. In some embodiments, the first and second correction elements 52 and 54 may be the same, and, in other embodiments, the first and second correction elements may be different.

For some embodiments, the correction elements 52 and 54 of the transverse displacement correction device 50 may include, without limitation, wedges, glass plates, waveguides, gratings, and the like. The first and second correction elements 52 and 54 are configured to cooperatively eliminate transverse beam displacement or offset resulting from the Brewster's angle or other non-normal angled beam input surface of the gain medium or any additional optical elements within the laser cavity which may contribute to beam displacement. As a result, the laser beam 16 remains stable in a transverse dimension over the tunable range of wavelengths of the laser system 10.

Some tuning devices 28 may include a birefringent filter as shown in FIG. 1. Such a birefringent filter may serve to tune the laser system 10 to a desired wavelength and may also serve to control the bandwidth or line width of the selected wavelength. Adjustment of the birefringent filter 28 may be carried out by rotational adjustment of the birefringent filter or any other suitable method. For some embodiments, such as the embodiment shown in FIG. 4, the wavelength tuning device 28 may include a refractive prism disposed in the laser beam path and configured to spatially spread the laser beam according to wavelength. A narrow slit that is translatable in a direction along the direction of the spatial spread may then be used to select a wavelength centered at a desired wavelength of operation. For some embodiments, as shown in FIG. 4, the narrow slit may be remotely actuated by a controllable motor. For some embodiments, the tuning device 28 may be tunable over a wavelength range of about 500 nm. For some embodiments, the tuning device is tunable over wavelengths of about 650 nm to about 1100 nm. Although the laser system embodiments illustrated and discussed herein generally are directed to tunable laser systems and include tuning devices, such laser systems and methods of controlling beam stability may also be used without such tunability or tuning devices. More specifically, some embodiments of laser systems may be configured to generate ultrashort laser pulses with stable laser beam paths which are capable of operating over a broad range of wavelengths simultaneously. The use of beam angle correction devices, transverse displacement correction devices and associated methods of each discussed herein may allow such laser systems to operate while maintaining stable beam position.

For some embodiments, both opposed beam input surfaces 24 and 26 of the gain medium 18 include angled surfaces at Brewster's angle relative to the laser beam path within the gain medium 18 for a laser beam 16 tuned to a band centered at a wavelength within the predetermined range of wavelengths. For some embodiments, the Brewster's angle for the beam input surfaces 24 and 26 of the gain medium 18 may be determined by a wavelength approximately in the middle of the range of predetermined wavelengths of the wavelength tuning element. In the illustrated embodiment, a single gain medium 18 is positioned within the laser cavity. Optionally, more than one gain medium devices 18 may be positioned within the laser cavity. The gain medium 18 may be formed from at least one dispersive material and may include one or more surfaces formed at Brewster's angle or other non-normal beam input angle relative to the incident intracavity optical beam. As such, for the embodiment shown, the intracavity laser beam path 16 is not perpendicular to the first beam input surface 24 or the second beam input surface 26 of the gain medium 18.

During use, the gain medium 18 absorbs at least a portion of the pump beam 20. As shown, both beam input surfaces 24 and 26 of the gain medium 18 includes angled surfaces formed at Brewster's angle. For some embodiments, other non-normal angles relative to the incident pump beam may be used as well as the use of one angled input surface in combination with a perpendicular surface of the gain medium 18. Further, the gain medium 18 may be constructed from a variety of lengths, shapes, thicknesses, transverse dimensions, and the like. Useful materials for the gain medium may include, without limitation, Ti:sapphire, Nd:glass, Nd:KYW, Nd:KGW, Nd:YVO4, Nd:GdYVO4, Cr:LiCAF, Cr:LiSAF, Cr:forsterite, Yb:glass, Yb:KGW, Yb:KYW, Yb:YVO4, Yb:CaF2, alexandrite, laser dyes in a fluid solvent, non-linear optical crystals, and the like. When illuminated by the pump beam 20, the gain medium 18 provides gain for a laser beam 16 having a wavelength different from the pump beam 20 in response to excitation of the gain medium 18 by the pump beam 20. For some embodiments, the gain medium 18 may have a cylindrical shape with a length of about 10 mm to about 30 mm. With use of a non-linear crystal as the gain medium, gain is available only when a pump beam is present in the crystal. A system based on such non-linear gain media is commonly referred to as an optical parametric oscillator. The discussion herein that has referred to beam correction devices and methods in a laser may also be applied to optical parametric oscillators. Examples of materials useful as gain media in optical parametric oscillators includes, without limitation, crystals such as lithium triborate (LBO), beta barium borate (BBO), bismuth borate (BiBO), potassium niobate (KNbO3), lithium niobate, periodically poled lithium niobate (PPLN), KTP, periodically poled KTP, CLBO, KDP, KD*P, and the like.

In the illustrated embodiment, the pump source 22 is located external to the laser cavity. Exemplary pump sources 22 may include, without limitation, diode lasers, gas lasers, solid state lasers, electromagnetic radiation sources, and the like. In the illustrated embodiment, the pump source 22 emits a pump beam 20 which is directed into the gain medium 18 by means of a dichroic mirror 32 which is configured to reflect light at the lasing wavelengths of the laser system but transmit light of the pump beam 20. The pump source 22 may be configured to produce any variety of pump signals to the gain medium 18, including, without limitation, electromagnetic radiation and the like. For some embodiments, the pump source 22 may include a laser, more specifically, the pump source 22 may include a diode laser. Some pump source embodiments 22 may include lasers such as neodymium vanadate lasers with an intra-cavity frequency doubler such as an LBO crystal. Such a pump source 22 may produce a CW pump beam at a wavelength of about 360 nanometers to about 1100 nanometers, more specifically, about 400 nanometers to about 700 nanometers, and even more specifically, about 523 nanometers to about 533 nanometers for some embodiments.

One or more fold mirrors may be used to direct the pump beam 20 into the laser cavity. In the illustrated embodiment, a first fold mirror 56 directs the pump beam 20 through a second dichroic mirror 32 of the laser cavity into the gain medium 18 within the laser cavity. The dichroic mirror 32 may be configured to transmit the pump beam 20 while reflecting a laser beam 16 from the gain medium 18 having a wavelength different from that of the pump beam 20. In some embodiments, the pump beam 20 may be directed into gain medium 18 without passing through a dichroic mirror 32. For these embodiments, the angular separation of the pump beam 20 and the intracavity laser beam 16 is used at an intracavity folding mirror such that the mirror can reflect the intracavity laser beam while allowing the pump beam to pass by the edge of the mirror. In some embodiments, a difference between the polarization of the pump beam 20 and the intracavity laser beam 16 may be used by positioning a polarization cube or a thin-film polarizer in place of the intracavity dichroic mirror 32 such that an optical pump beam of one polarization could be transmitted and the intracavity beam of an opposite polarization could be reflected. In some embodiments, the pump beam 20 may be coupled into gain medium 18 by use of a prism or a grating or other dispersive optical element.

One or more additional components may be used to condition, direct or otherwise alter the pump beam 20 before entering the laser cavity. Any variety of device may be used to alter or otherwise condition the pump beam 20, including, without limitation, signal modulators, choppers, acousto-optic devices, q-switches, gratings, spatial filters, wavelength filters, volume Bragg gratings, pulse stretchers, and the like. Any number and/or variety of optical elements may be positioned within the laser cavity and configured to modulate or otherwise condition the laser beam 16.

For some embodiments, one or more q-switches, mode-lockers, electro-optical devices, or acousto-optical devices may be positioned within the laser cavity and configured to modulate, mode-lock or otherwise tune the laser cavity or laser beam 16. For some embodiments, the laser system 10 may include one or more reflective elements which are configured to be automatically adjustable along at least one axis to accommodate variations in beam path due to a variety of influences. For some embodiments, the optical elements of the laser cavity may be configured such that the laser cavity has substantially the same effective laser beam path for beams of different wavelengths over the wavelength range of the wavelength tuning element 28. Any number of additional optical elements may be positioned within the laser cavity, including, without limitation, additional fold mirrors, tuning slits or apertures, q-switches, lenses, wedges, gratings, Bragg gratings, harmonic generation crystals, non-linear optical materials, Lithium Niobate crystals, periodically poled Lithium Niobate crystals, aperiodically poled Lithium Niobate crystals and the like. The laser cavity shown in FIG. 1 comprises a folded laser cavity, however, the laser cavity need not include a folded cavity. As such, various optical elements included in FIG. 1 may be eliminated without affecting the performance of the laser system 10 illustrated.

In use, a pump beam 20 is generated by the pump source 22 and passes through the gain medium 18. The pump beam 20 excites the gain medium 18 which begins to emit a laser beam 16 which is at least partially confined by the laser cavity. As the laser beam 16 is amplified by the gain medium 18, the beam 16 begins to form a laser beam pulse oscillating back and forth within the laser cavity at a first wavelength determined by the tuning device 28 of the laser system 10. The laser beam of the first wavelength may then be emitted from the gain medium on a first beam path. The laser system 10 may then be tuned to a second wavelength which is different from the first wavelength. A laser beam at the second wavelength exits the gain medium 18 on a second beam path different from the first beam path. The laser beam of the second wavelength is then passed through at least one angular beam position correction element 34 or 36 that refracts the laser beam of a second wavelength to an optical path that is substantially parallel to the first beam path.

FIG. 4 shows an embodiment of a tunable laser system 60 configured on two levels or optical planes that operates in a similar manner to the tunable laser system 10 shown in FIG. 1 and discussed above. The laser system 60 shown in FIG. 4 may have some or all of the same features, dimensions and materials as the laser system 10 shown in FIG. 1. The laser system 60 includes a first reflector 62 and at least a second reflector 64, which may be in the form of an output coupler, which are aligned to create a laser cavity. At least one gain medium 18 may be positioned between the first and second reflectors 62 and 64. A pump beam source 66 emits a pump beam 68 at a pump wavelength into the laser cavity and into the gain medium 18 along a laser beam path 70 within the gain medium 18. As illustrated, the gain medium 18 may include one or more beam input surfaces 24 and 26 formed at a non-perpendicular angle, such as a Brewster angle, relative to an incident laser beam path 70 in order to minimize optical loss through reflection.

The laser system 60 shown includes a wavelength tuning device configured to tune the laser system 60 to lase at a band centered at a predetermined wavelength that can be controllably varied over a predetermined range of wavelengths. The laser system 60 shown in FIG. 4 also includes a first collimating optic 30 disposed between the gain medium 18 and the end mirror 62 and a second collimating optic 32 disposed between the gain medium 18 and the output coupler 64. The collimating optics 30 and 32 are configured to increase collimation of the laser beam 70 emitted from the gain medium 18 into the respective collimating optic. For some embodiments, the first and second collimating optics 30 and 32 may include concave reflective optics having a focal length. For such embodiments, it may be desirable for each collimating optic 30 and 32 to be disposed a distance from the gain medium 18 which is approximately the same as the focal length of the respective collimating optic. Although the collimating optics 30 and 32 are configured to increase collimation of the laser beams emitted from the gain medium 18, the collimating optics do not completely collimate the laser beams 70 and the laser beams may still need additional angular correction.

As such, the laser system 60 also includes at least one beam angle correction device configured to passively correct angular laser beam deviation due to variation of the predetermined wavelength of a wavelength tuning device 76. For the embodiment shown, the beam angle correction device includes a first beam angle correction element 34 including a refractive wedge optic which is disposed in the laser beam path and a second beam angle correction element 36 including a wedge optic also disposed in the laser beam path. The first beam angle correction element 34 is disposed in the laser cavity between the gain medium 18 and the end mirror 62 and the second beam angle correction element 36 is disposed in the laser cavity between the gain medium 18 and the output coupler 64. The wedge optics 34 and 36 may be positioned with a tilt on a single axis of the wedge optics with respect to beam path 70 as discussed above. The wedge optics 34 and 36 may also be oriented or positioned such that a shorter wavelength of a first and second wavelength that is emitted from the gain medium passes through a thinner end 42 of the refractive wedge optic than a longer wavelength of the first and second wavelengths.

For some embodiments, the refractive wedge optics 34 and 36 may include an inclusive wedge angle 47 of about 1 degree to about 2 degrees, more specifically, about 1.4 degrees to about 1.6 degrees. For some embodiments, the refractive wedge optics 34 and 36 may be made from materials including fused silica, glass, quartz, or any other suitable refractive optical material useful over the predetermined range of wavelengths of operation of the laser system 60. The refractive wedge optics 34 and 36 may also be tilted relative to a laser beam axis 70 such that a surface normal of the refractive wedge optic facing the optical gain medium 18 forms an angle 48 substantially equal to Brewster's angle with respect to the laser beam axis.

At least one transverse displacement correction device may optionally be positioned within the laser cavity and configured to passively correct for the transverse spatial displacement of the laser beam due to a change in the wavelength of the laser beam as the laser system 60 is tuned with the tuning device 76. If used in conjunction with one or more beam angle correction devices as discussed above, the laser system 60 may be configured to passively adjust a transverse position of the laser beam 70 such that laser beams of all wavelengths within the predetermined range have substantially the same laser beam path. In the illustrated embodiment, the transverse displacement correction device includes a first correction element 72 in the form of a prism and at least a second correction element 108 also in the form of a prism. Each of these prisms independently form a prism pair with prism 74, and the difference in optical pathlengths of the two prism pairs, the 72 plus 74 pair and the 74 plus 108 pair, provides the transverse beam offset correction needed to insure that the transverse beam movement at the output coupler 64 caused by wavelength tuning using tuning mechanism 76 is minimized. In the configuration illustrated in FIG. 4, the amount of transverse beam offset correction can be changed as needed by adjustment of the spacing between prisms 72 and 108. In some embodiments, the first and second correction elements 72 and 108 are spaced apart by a predetermined distance which can be used to adjust the amount of transverse correction for a given prism pair or the like. The angular correction function of one or more of the beam angle correction device elements 34 and 36 may also be incorporated into one or more of the elements of the transverse displacement correction device. For example, the function of one of the wedge elements 34 or 36 of the beam angle correction device shown in FIG. 4 may be replaced by varying the wedge angle of one or both of the prisms 72 or 108. For some embodiments, the first and second correction elements 72 and 108 are physically spaced apart by about 0.25 inches to about 2 inches. The first and second correction elements are configured to cooperatively eliminate transverse beam displacement or offset resulting from the Brewster's angle or other non-normal angled beam input surface of the gain medium or any additional optical elements within the laser cavity which may contribute to beam displacement. As a result, the laser beam 70 remains stable in a transverse dimension at the output coupler 64 over the tunable range of wavelengths of the laser system 60.

The wavelength tuning device 76 for the embodiment of FIG. 4 may include a device such as the birefringent filter shown in FIG. 1. However, the tuning device shown in FIG. 4 includes refractive prism 74 disposed in the laser beam path 70 and configured to spatially spread the laser beam according to wavelength. A narrow slit 78 that is translatable in a direction along the direction of the spatial spread, as shown by arrow 80, may then be used to select a wavelength centered at a desired wavelength of operation. For some embodiments, the narrow slit 78 may be remotely actuated by a motor 82 which may be controlled by a computer processor coupled to the motor. For some embodiments, the tuning device 76 may provide for tuning of the wavelength of laser system 60 over a wavelength range of about 500 nm. For some embodiments, the tuning device 76 provides for tuning of the wavelength of laser system 60 over wavelengths of about 650 nm to about 1100 nm.

For some embodiments, the refractive prism 74 of the tuning device 76 may be translatable along its taper axis 86 in order to maintain a controlled amount of refractive wavelength dispersion within the laser cavity by controlling the amount of refractive material through which the laser beam 70 passes. Because the material of the prism 74 is more dispersive than air, increasing the laser beam path length through prism 74 will increase the positive material dispersion seen by the laser beam 70. In other words, if the wedge shape of the prism 74 is inserted further into the laser beam during operation, the dispersive nature of the prism material will increase the positive material dispersion content of the laser system overall. If the prism wedge 74 is withdrawn from the laser beam 70, the amount of positive material dispersion in the laser system will be decreased. The positive material dispersion in the laser system 60 is balanced by the negative dispersion provided by prism pair 72 plus 74 and prism pair 74 plus 108. For some embodiments, translation of the refractive prism 74 may be actuated by a motor 88 which may be controlled by a computer processor coupled to the motor 88. In general, the laser system 60 may include one, two, three, four or more computer processors 84 and associated circuit boards in order to receive feedback and generate signals in response to the feedback. For example, the third fold mirror 90 may be a piezo-electric adjustable optic that can be adjusted based on feedback from a laser power detector disposed beyond the output coupler 64. Based on application of a dither signal to the piezo-electric adjusters of third fold mirror 90 and the feedback from the laser power detector, a computer processor 84 may be configured to generate a signal to the third fold mirror 90 adjustment piezo actuators to correct for misalignment of the pump beam 68 relative to laser beam path 70 within laser system 60 and the like. In addition, collimating mirror 32 may be a piezo-electric adjustable optic that can be adjusted based on feedback from a position sensitive detector or 4-quadrant detector located beyond the output coupler 64 that can be processed by computer processor 84 which can generate a signal to the collimating mirror 32 adjustment piezo actuators to correct for residual misalignment of the laser beam path 70 within laser system 60. For some embodiments, the prism 74 may include glass, quartz, fused silica or any other suitable refractive material.

For some embodiments, both opposed beam input surfaces 24 and 26 of the gain medium 18 include angled surfaces at Brewster's angle relative to the laser beam path 70 within the gain medium 18 for a laser beam 70 tuned to a band centered at a wavelength within the predetermined range of wavelengths. For some embodiments, the Brewster's angle for the beam input surfaces 24 and 26 of the gain medium 18 may be determined by a wavelength approximately in the middle of the range of predetermined wavelengths of the wavelength tuning element. In the illustrated embodiment, a single gain medium 18 is positioned within the laser cavity. Optionally, more than one gain medium device 18 may be positioned within the laser cavity. The gain medium 18 may be formed from at least one dispersive material and may include one or more surfaces formed at Brewster's angle or other non-normal beam input angle relative to the incident intracavity optical beam.

In the illustrated embodiment, the pump source 66 is located external to the laser cavity. Exemplary pump sources 66 include, without limitation, diode lasers, gas lasers, solid state lasers, electromagnetic radiation sources, and the like. In the illustrated embodiment, the pump source 66 emits a pump beam 68 which is directed into the gain medium 18 by means of a dichroic mirror 32 which is configured to reflect light at the lasing frequencies of the laser system but transmit light of the pump beam 68. The pump source 66 may be configured to produce any variety of pump signals to the gain medium, including, without limitation, electromagnetic radiation and the like. For some embodiments, the pump source 66 may include a laser, more specifically, the pump source may include a diode laser. Some pump source embodiments 66 may include lasers such as neodymium vanadate lasers with an intra-cavity frequency doubler such as an LBO crystal. Such a pump source 66 may produce a CW pump beam at a wavelength of about 360 nanometers to about 1100 nanometers, more specifically, about 400 nanometers to about 700 nanometers, and even more specifically, about 523 nanometers to about 533 nanometers for some embodiments.

One or more fold mirrors may be used to direct the pump beam into the laser cavity. In the illustrated embodiment, a first fold mirror 92 directs the pump beam 68 through the second dichroic mirror 32 of the laser cavity into the gain medium 18 within the laser cavity. A second fold mirror 94 and third fold mirror 90 are used to direct the pump beam 68 from the pump source 66 to the second dichroic mirror 32. A fourth fold mirror 96, fifth fold mirror 98, sixth fold mirror 100 and seventh fold mirror 102 are used between the gain medium 18 and the output coupler 64 in order to define a laser beam path 70 of a desired length that includes the desired optical elements. The dichroic mirror 32 may be configured to transmit the pump beam 68 while reflecting a laser beam 70 from the gain medium 18 having a wavelength different from that of the pump beam 68. In some embodiments, a difference between the polarization of the pump beam 68 and the intracavity laser beam may be used by positioning a polarization cube or a thin-film polarizer in place of the intracavity dichroic mirror such that an optical pump beam of one polarization could be transmitted and the intracavity beam of an opposite polarization could be reflected. In some embodiments, the pump beam 68 may be coupled into gain medium 18 by use of a prism or a grating or other dispersive optical element.

One or more additional components may be used to condition, direct or otherwise alter the pump beam 68 before entering the laser cavity. Any variety of device may be used to alter or otherwise condition the pump beam 68, including, without limitation, signal modulators, choppers, acousto-optic devices, q-switches, gratings, spatial filters, wavelength filters, volume Bragg gratings, pulse stretchers, and the like. Any number and/or variety of optical elements may be positioned within the laser cavity and configured to modulate or otherwise condition the laser beam 70.

For some embodiments, one or more q-switches, modelockers, electro-optical devices, or acousto-optical devices may be positioned within the laser cavity and configured to modulate, mode lock or otherwise tune the laser cavity or laser beam 70. FIG. 4 shows an acousto-optical modulator (AOM) 104 disposed in the laser cavity adjacent the output coupler 64. The AOM 104 may be configured to provide a mode locking function for the laser system 60. For some embodiments, the laser system 60 may include one or more reflective elements which are configured to be automatically adjustable along at least one axis to accommodate variations in beam path due to a variety of influences. An adjustable reflector or mirror is used for the third fold mirror 90 in some embodiments to assist with maintaining alignment of the pump beam 68. For some embodiments, the optical elements of the laser cavity may be configured such that the laser cavity has substantially the same effective laser beam path length for beams of different wavelengths over the wavelength range of the wavelength tuning element 76.

In use, a pump beam 68 is generated by the pump source 66 and is reflected by the third fold mirror 90, second fold mirror 94 and first fold mirror 92 through the second dichroic optic 32 which also includes the first collimating optic. The pump beam 68 then passes through the gain medium 18. The pump beam 68 excites the gain medium 18 which begins to emit a laser beam 70 which is at least partially confined by the laser cavity. As the laser beam 70 is amplified by the gain medium 18, the beam begins to form a laser beam pulse oscillating back and forth within the laser cavity between the end mirror 62 and the output coupler 64 at a first wavelength determined by the tuning device 76 of the laser system 60. The laser beam 70 of the first wavelength may then be emitted from the gain medium 18 on a first beam path. The laser system 60 may then be tuned to a second wavelength which is different from the first wavelength and which exits the gain medium 18 on a second beam path different from the first beam path. The laser beam of the second wavelength then propagates through at least one angular beam position correction element 34 and 36 in the form of the wedge optics of the beam angle correction device which refracts the laser beam of a second wavelength to an optical path that is substantially parallel to first beam path. Such a process is shown in FIG. 3 and discussed above in more detail with regard to FIG. 3. If the transverse displacement correction device is properly coupled to the laser cavity, the path of the first wavelength and the second wavelength may follow substantially the same path within the laser cavity. For some embodiments, all laser beam wavelengths within the predetermined range of wavelengths may have substantially the same path, both with respect to transverse and angular position within the laser cavity.

The progression of a laser beam 70 within the laser cavity of the laser system 60 of FIG. 4 occurs on two different levels or optical planes that are vertically separated and include several optical elements. A laser beam pulse 70 starting at the end mirror 62 then passes through the first wedge optic 34 of the beam angle correction device and is reflected by the first collimating optic 30 into the gain medium 18. After amplification by and emission from the gain medium 18, the laser pulse 70 is reflected and substantially collimated by the second collimating optic 32. The laser pulse 70 then propagates to the fourth fold mirror 96. The fourth fold mirror 96 reflects the laser pulse through the second wedge optic 36 of the beam angle correction device and onto the fifth fold mirror 98. The first and second wedge optics 34 and 36 of the beam angle correction device function as discussed above with regard to FIG. 3 wherein the wedge optics 34 and 36 serve to converge laser beams of differing wavelengths so as to passively align the laser cavity for the differing wavelengths when tuning the laser system 60.

The fifth fold mirror 98 reflects the laser pulse 70 to a first prism element 72 which then refracts the laser pulse 70 to the sixth fold mirror 100 and seventh fold mirror 102. The laser pulse 70 is then reflected by the seventh fold mirror 102 to the second prism element 74 of the displacement correction device which also serves as part of the tuning device 76 of the laser system 60. The second prism 74 refracts the laser pulse 70 through the narrow slit 78 of the tuning device 76. When passing through the narrow slit 78, the laser pulse 70 has been spread out transversely according to wavelength by the prism pair including the first and second prisms 72 and 74. Only the wavelength band selected by the narrow slit 78 of the tuning device 76 is allowed to pass and lase. Once the laser pulse 70 passes through the narrow slit 78, the pulse 70 is reflected upward and then back by a retrograde or retro optic 106 shown in elevation section in FIG. 4A.

The beam path of the laser pulse 70 from the end mirror 62 to the bottom of the retro optic 104 takes place entirely on a first or lower level of the laser system 60. Once the laser pulse 70 is reflected by the retro optic 104, the laser pulse 70 is on a second or upper level. The laser pulse 70 is then reflected from a top portion of the retro optic 104 back to the second prism element 74. The second prism element 74 is functional on both the upper and lower level of the laser system 60, as are the sixth and seventh fold mirrors 100 and 102. The second prism element 74 refracts the laser pulse 70 back to the seventh fold mirror 102 and then the sixth fold mirror 100 to a third prism element 108. The third prism element 108 refracts the laser pulse 70 to the AOM 104, which may serve to mode lock or partially mode lock the laser pulse 70. After propagating through the AOM 104, the laser pulse 70 propagates to the output coupler 64. The output coupler 64 reflects a percentage of the laser pulse 70 back along the beam path just described in reverse order to the end mirror 62, but allows a predetermined percentage of the laser pulse 70 to pass through the output coupler 64 as laser output which may then be used for a desired application.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the invention. Although embodiments of the invention have been described in substantial detail with reference to one or more specific embodiments, those of ordinary skill in the art will recognize that changes may be made to the embodiments specifically disclosed in this application, yet these modifications and improvements are within the scope and spirit of the invention.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the invention claimed. The term "a" or "an" can refer to one of or a plurality of the elements it modifies (e.g., "a reagent" can mean one or more reagents) unless it is contextually clear either one of the elements or more than one of the elements is described. Thus, it should be understood that although embodiments have been specifically disclosed by representative embodiments and optional features, modification and variation of the concepts herein disclosed may be resorted to by those skilled in the art, and such modifications and variations are considered within the scope of this invention.

Certain embodiments of the invention are set forth in the claim(s) that follow(s).

What is claimed is:

1. A wavelength tunable laser system, comprising:
   a laser cavity defined by an end mirror disposed at a first end of the laser cavity and an output coupler disposed at a second end of the laser cavity;

a gain medium disposed within the laser cavity including an opposed pair of beam input surfaces with at least one of the beam input surfaces comprising an angled beam input surface which is formed at an angle which is nonperpendicular to a laser beam path within the gain medium;

a pump source configured to generate a pump beam that passes through the gain medium along the laser beam path within the gain medium;

a wavelength tuning device configured to tune the laser system to lase at a band centered at a predetermined wavelength that can be controllably varied over a predetermined range of wavelengths; and at least one beam angle correction device configured to passively correct angular laser beam deviation due to variation of the predetermined wavelength of the wavelength tuning element.

2. The laser system of claim 1 wherein:

the at least one beam angle correction device comprises a beam angle correction element including a refractive wedge optic disposed in the laser beam path such that a continuous thickness axis of the refractive wedge optic is substantially orthogonal to a direction of angular deviation of the laser beam as a function of wavelength variation; and a shorter wavelength of a first and second wavelength that is emitted from the gain medium passes through a thinner end of the refractive wedge optic than a longer wavelength of the first and second wavelengths.

3. The laser system of claim 2 wherein the refractive wedge optic is tilted such that a surface of the refractive wedge optic facing the optical gain medium forms an angle substantially equal to Brewster's angle with respect to the laser beam axis.

4. The laser system of claim 2 wherein the refractive wedge optic comprises an inclusive wedge angle of about 1 degree to about 2 degrees.

5. The laser system of claim 2 wherein the refractive wedge optic comprises an inclusive wedge angle of about 1.4 degrees to about 1.6 degrees.

6. The laser system of claim 2 wherein the refractive wedge optic comprises fused silica.

7. The laser system of claim 1 wherein the beam angle correction device comprises a first beam angle correction element disposed in the laser cavity between the gain medium and the end mirror and a second beam angle correction element disposed in the laser cavity between the gain medium and the output coupler.

8. The laser system of claim 7 wherein the first and second beam angle correction elements comprise refractive wedge optics.

9. The laser system of claim 1 wherein both beam input surfaces of the gain medium comprise angled surfaces at Brewster's angle relative to the laser beam path within the gain medium for a laser beam tuned to a band centered at a wavelength within the predetermined range of wavelengths of the wavelength tuning element.

10. The laser system of claim 9 wherein the Brewster's angle for the beam input surfaces is determined by a wavelength approximately in the middle of the range of predetermined wavelengths of the wavelength tuning element.

11. The laser system of claim 1 further comprising a first collimating optic disposed between the gain medium and the end mirror and a second collimating optic disposed between the gain medium and the output coupler wherein the collimating optics are configured to collimate the laser beam emitted from the gain medium to the respective collimating optic.

12. The laser system of claim 11 wherein the first and second collimating optics comprise concave reflective optics.

13. The laser system of claim 11 wherein the first collimating optic comprises a focal length and the first collimating optic is disposed a distance from the gain medium which is substantially the same as the focal length.

14. The laser system of claim 11 wherein the second collimating optic comprises a focal length and the second collimating optic is disposed a distance from the gain medium which is substantially the same as the focal length.

15. The laser system of claim 1 wherein the wavelength tuning device comprises a refractive prism disposed in the laser beam path and configured to spread the laser beam by wavelength and a narrow slit that is translatable in a direction along the direction of spread.

16. The laser system of claim 15 wherein the narrow slit is remotely actuated by a controllable motor.

17. The laser system of claim 15 wherein the refractive prism is translatable along a taper axis of the prism in order to maintain a controlled amount of dispersion within the laser cavity by providing dispersion adjustment through control of the amount of refractive material through which the laser beam passes.

18. The laser system of claim 17 wherein the translation of the refractive prism is actuated by a motor.

19. The laser system of claim 1 further comprising one or more reflective elements which are configured to be automatically adjustable along at least one axis to accommodate variations in beam path.

20. The laser system of claim 1 wherein the optical elements of the laser cavity are configured such that the laser cavity has substantially the same effective laser beam path for beams of different wavelengths over the wavelength range of the wavelength tuning element.

21. The laser system of claim 1 wherein the tuning element is tunable over a wavelength range of about 500 nm.

22. The laser system of claim 21 wherein the tuning element is tunable over wavelengths of about 650 nm to about 1100 nm.

23. The laser system of claim 1 wherein the pump source comprises a laser.

24. The laser system of claim 23 wherein the pump source comprises a diode laser.

25. The laser system of claim 1 wherein the gain medium comprises a Ti:sapphire crystal.

26. The laser system of claim 1 further comprising a transverse displacement correction device disposed in the laser beam path configured to passively adjust a transverse position of the laser beam such that laser beams of all wavelengths within the predetermined range have substantially the same laser beam path.

27. The laser system of claim 26 wherein the transverse displacement correction device comprises a first prism element and a second prism element that are separated from each other by a predetermined distance.

28. The laser system of claim 27 wherein the prism elements are the same.

29. A wavelength tunable laser system, comprising:

a laser cavity defined by an end mirror disposed at a first end of the laser cavity and an output coupler disposed at a second end of the laser cavity;

a gain medium disposed within the laser cavity including an opposed pair of beam input surfaces comprising angled surfaces at Brewster's angle relative to a laser beam path within the gain medium for a laser beam tuned to a band centered at a wavelength within a predetermined range of wavelengths;

a pump source configured to generate a pump beam that passes through the gain medium along the laser beam path within the gain medium;

a wavelength tuning element configured to tune the laser system to lase at a band centered at a predetermined wavelength that can be controllably varied over said predetermined range of wavelengths;

a first beam angle correction element is disposed in the laser cavity between the gain medium and the end mirror and configured to passively correct angular laser beam deviation due to variation of the predetermined wavelength of the wavelength tuning element; and a second beam angle correction element is disposed in the laser cavity between the gain medium and the output coupler and configured to passively correct angular laser beam deviation due to variation of the predetermined wavelength of the wavelength tuning element.

30. The laser system of claim 29 wherein:

the first beam angle correction element includes a first refractive wedge optic disposed in the laser beam path such that a continuous thickness axis of the first refractive wedge optic is substantially orthogonal to a direction of angular deviation of the laser beam as a function of wavelength variation and such that a shorter wavelength of a first and second wavelength that is emitted from the gain medium passes through a thinner end of the first refractive wedge optic than a longer wavelength of the first and second wavelengths; and the second beam angle correction element includes a second refractive wedge optic disposed in the laser beam path such that a continuous thickness axis of the second refractive wedge optic is substantially orthogonal to a direction of angular deviation of the laser beam as a function of wavelength variation and such that a shorter wavelength of a first and second wavelength that is emitted from the gain medium passes through a thinner end of the second refractive wedge optic than a longer wavelength of the first and second wavelengths.

31. The laser system of claim 30 wherein the first and second refractive wedge optics are tilted such that respective surfaces of the first and second refractive wedge optics which are facing the optical gain medium form an angle substantially equal to Brewster's angle with respect to the laser beam axis.

32. The laser system of claim 30 wherein the first and second refractive wedge optics comprise an inclusive wedge angle of about 1 degree to about 2 degrees.

33. The laser system of claim 30 wherein the first and second refractive wedge optics comprise an inclusive wedge angle of about 1.4 degrees to about 1.6 degrees.

34. The laser system of claim 30 wherein the first and second refractive wedge optics comprise fused silica.

35. The laser system of claim 29 wherein the Brewster's angle for the beam input surfaces of the gain medium is determined by a wavelength approximately in the middle of the range of predetermined wavelengths of the wavelength tuning element.

36. The laser system of claim 29 further comprising a first collimating optic disposed between the gain medium and the end mirror and a second collimating optic disposed between the gain medium and the output coupler wherein the collimating optics are configured to collimate the laser beam emitted from the gain medium to the respective collimating optic.

37. The laser system of claim 36 wherein the first and second collimating optics comprise concave reflective optics.

38. The laser system of claim 37 wherein the first collimating optic comprises a focal length and the first collimating optic is disposed a distance from the gain medium which is substantially the same as the focal length.

39. The laser system of claim 37 wherein the second collimating optic comprises a focal length and the second collimating optic is disposed a distance from the gain medium which is substantially the same as the focal length.

* * * * *